United States Patent
Wang

(10) Patent No.: US 9,471,810 B2
(45) Date of Patent: *Oct. 18, 2016

(54) METHOD AND SYSTEM FOR DETERMINING HIDDEN STATES OF A MACHINE USING PRIVACY-PRESERVING DISTRIBUTED DATA ANALYTICS AND A SEMI-TRUSTED SERVER AND A THIRD-PARTY

(71) Applicant: Mitsubishi Electric Research Laboratories, Inc., Cambridge, MA (US)

(72) Inventor: Ye Wang, Andover, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/641,522

(22) Filed: Mar. 9, 2015

(65) Prior Publication Data

US 2016/0267297 A1    Sep. 15, 2016

(51) Int. Cl.
| | |
|---|---|
| *G06F 15/16* | (2006.01) |
| *H04L 29/08* | (2006.01) |
| *G06F 21/62* | (2013.01) |
| *G06F 17/30* | (2006.01) |
| *G06N 7/00* | (2006.01) |
| *G06F 17/18* | (2006.01) |

(52) U.S. Cl.
CPC .......... *G06F 21/6263* (2013.01); *G06F 17/18* (2013.01); *G06F 17/30598* (2013.01); *G06N 7/005* (2013.01)

(58) Field of Classification Search
CPC .............. G06F 21/6263; G06F 17/18; G06F 17/30598; G06N 7/005
See application file for complete search history.

(56) References Cited

U.S. PATENT DOCUMENTS

| | | | |
|---|---|---|---|
| 6,965,861 B1* | 11/2005 | Dailey | G06F 17/2775 704/1 |
| 2007/0179891 A1* | 8/2007 | Lu | G06F 21/606 705/50 |
| 2008/0172233 A1* | 7/2008 | Smaragdis | G10L 15/30 704/256 |
| 2012/0143922 A1 | 6/2012 | Rane et al. | |

OTHER PUBLICATIONS

Huseyin Polat et al., "Private Predictions on Hidden Markov Models," Artificial Intelligence Review, Kluwer Academic Publishers, DO, vol. 34, No. 1, May 22, 2010, pp. 53-72, XP019812204. sec 4.2.

* cited by examiner

*Primary Examiner* — Andrew Nalven
*Assistant Examiner* — Mary Li
(74) *Attorney, Agent, or Firm* — Gene Vinokur; James McAleenan; Hironori Tsukamoto

(57) ABSTRACT

A method classifies data to determine hidden states of a machine by first acquiring data from the machine in a client, which is permuting randomly, and then chaff is inserted before transmitting to server as private data. The server classifies the private data according to a hidden Markov model to obtain permuted noisy estimates of states of the machine and the chaff, which are transmitted to a third party. The third party removes the chaff and inverts noisy estimates using a permutation ordering to obtain unpermuted noisy estimates of the states of the machine.

8 Claims, 3 Drawing Sheets

METHOD AND SYSTEM FOR DETERMINING HIDDEN STATES OF A MACHINE USING PRIVACY-PRESERVING DISTRIBUTED DATA ANALYTICS AND A SEMI-TRUSTED SERVER AND A THIRD-PARTY

RELATED APPLICATION

This U.S. Patent Application is related to U.S. patent application Ser. No. 14/076,307, "Method for Determining Hidden States of Systems using Privacy-Preserving Distributed Data Analytics, filed by Wang on Nov. 11, 2013, incorporated herein by reference. In that Application, the goal is to classify data acquired by a client using a server, while preserving the privacy of the client's data.

FIELD OF THE INVENTION

This invention relates generally to data processing, and more particularly to enable data acquired by a client from a machine to be classified by a third-party with assistance of a semi-trusted server, while satisfying privacy constraints.

BACKGROUND OF THE INVENTION

The determination of the underlying, an unknown state, or a temporal sequence of states, of a machine from noisy samples is a fundamental classification problem relevant to various machine diagnostics and data analytics applications. Herein, the term "machine" is used to generally to refer to any device that performs an intended action while being in various states over time. Example machines can include vehicles, electronic systems, medical machines, computer systems, entertainments devices, and the like.

A classification method addressing this problem takes as input data samples and outputs a reconstruction of the underlying hidden states or other relevant information regarding these states.

For example, the machine can be in one of two states, "normal" or "broken," which cannot be directly observed. Instead, only noisy data, which are somehow related to the underlying states, can be obtained. Diagnosing whether the machine is functioning normally or is broken is a matter of inferring the underlying state from the acquired data. In general, there can be many states, e.g., "failure in component X," "failure in component Y," etc., and the machine can switch between the states over time.

One model that characterizes the situation of noisy data of an unknown temporally-evolving state is a hidden Markov model (HMM). Parameters of the HMM are the statistical distributions describing how the state evolves over time and how the samples are related to the underlying states. Given knowledge of these parameters, a Viterbi procedure, for example, is a classification method that outputs a most likely sequence of underlying states that produced the acquired data. Lacking knowledge of the parameters of the model can make the design of an effective classification method significantly more challenging.

So far, the above description of the problem involves a single party, e.g., a user of a client computer (client), which has access to the machine and can acquire the data, and directly applies the classification method to the data. However, the client may have insufficient computational resources.

Therefore, the invention consider a scenario that involves three parties, the client, a server computer (server) and a third-party computer (third-party) connected by a communication network, where the client acquires the data, and the third-party determines the underlying states, and the server provides assistance to enable the classification procedure for estimating the underlying states. The client wants the third-party to accurately determine the underlying states, perhaps motivated by other reasons, such as the desire to beneficially inform the third-party of the underlying machine behavior. For, example, the third-party may have the primary responsibility for maintaining the machine.

Other motivating factors for such a three-party scenario can also include asymmetries of information and/or computational capabilities between the client, server, and third-party, e.g., the server may have exclusive information about the machine model, better classification algorithms, and/or more computational resources, and external incentives for this scenario, i.e., the server and/or third-party provide a contracted maintenance service for the machine.

In the case of information asymmetry, it may be that neither the client, server, nor third-party alone has full knowledge of the machine parameters, i.e., the HMM statistical model, and thus, the coordination of these three entities may serve to produce a better reconstruction than any party could accomplish alone.

Naturally, there may be privacy constraints imposed by the client and the server in the context of this scenario. The client may wish to protect the privacy of the data by concealing the data to a reasonable degree, and/or the reconstructed states, e.g., to avoid revealing sensitive information related to the operation of the machine. The client may have different privacy requirements with respect to the server and the third-party.

For example, both the server and third-party may be service providers that are trusted to some degree, however the client still wishes to maintain as much privacy as possible while utilizing their services. The server may also wish to protect the privacy of its exclusive knowledge of the machine parameters by concealing the data to a reasonable degree, e.g., to maintain the value of its exclusivity. Thus, the problem is the construction of a coordinated classification method between these three parties that reconstructs of the underlying states while protecting the privacy of the involved parties.

SUMMARY OF THE INVENTION

The embodiments provide a method and system for classifying data to determine hidden states of a machine. The method operates in three parties: a client computer (client), a server computer (server), and a third-party computer (third-party). The client acquires the data, and the third-part receives the classification results. The server provides assistance in performing the classification in a distributed manner. In addition, the privacy considerations involve protecting the privacy of the client's data from both the server and the third-party.

The invention addresses the problem of performing the classification when there are privacy constraints and possible information and computational resource capability asymmetries between the three parties.

The method allows the server to assist in the reconstruction of the underlying hidden states for the third-party from the client's data observed from an HMM process. The server does not need knowledge of the state transition distribution. Instead, the server only needs to have either partial knowledge of the statistical distribution of the data given each possible state or a trained classification procedure that reconstructs a state estimate. The third-party does not need knowledge of the data distribution under each state.

The method provides a reasonable degree of privacy for the client by partially concealing from the server the data and reconstructed states, and by partially concealing from the third-party the data. The method also provides a reasonable degree of privacy to the server by mostly concealing the details of the server's knowledge of the data distributions and/or parameters of the classification procedure.

DETAILED DESCRIPTION OF THE PREFERRED EMBODIMENTS

Figure 1:
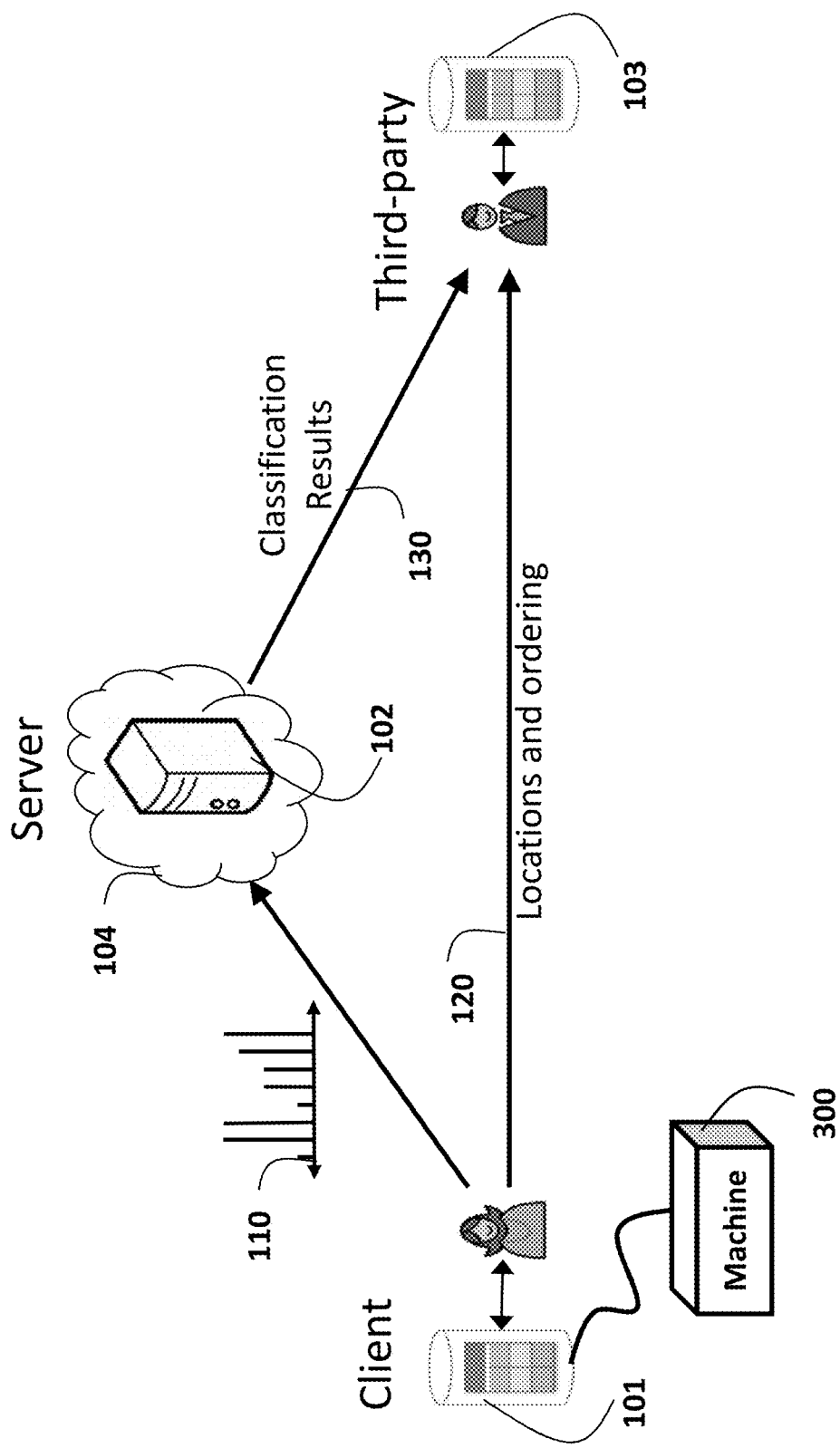
FIG. 1 is a schematic of a method for classifying data to determine hidden states of a machine according to embodiments of the invention.
Figure 3:
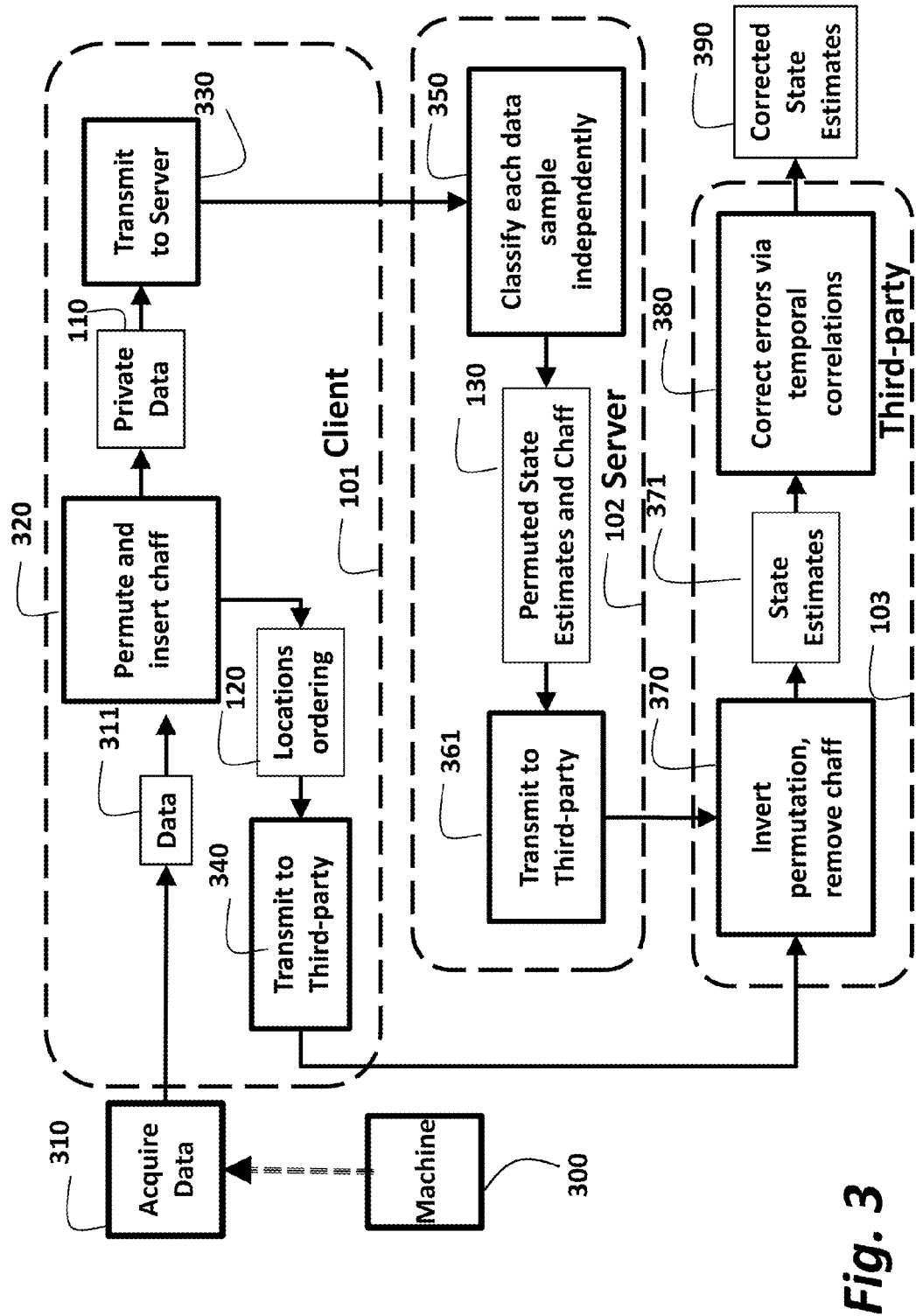
FIG. 3 is a flow diagram of a method for determining hidden states of noisy data according to embodiments of the invention.

FIG. 1 schematically shows a system for classifying data to determine hidden states of a machine 300 according to embodiments of the invention. FIG. 3 shows the detailed steps of the method. The system includes a client 101 under control by a user, a server 102, and a third-party 103 all connected by a communication network 104.

The client acquires data 310, in the form of samples, from the machine, and randomly permutes 320 the data, according to a permutation, to generate permuted data 110. The client also inserts chaff in the permuted data at locations to generate private data. The "chaff" includes artificial data points inserted randomly at the locations. Essentially, the chaff makes it difficult to decode the private data. Then, the client transmits 330 the private data 110 to the server 103. The client also transmits 340 the locations of the chaff and a permutation ordering to the third-party.

The server has model information and computational capabilities to assist in the classification of the data to recover these underlying states. The server classifies 350 the samples in the private independently according to a hidden Markov model (HMM) to obtain permuted noisy estimates of hidden states of the machine and the chaff 351 as classification results 130, which are transmitted to the third-party 103. It is understood that the classifier can be trained.

The third-party uses the chaff locations to remove the chaff, and then inverts 370 the classification results to obtain unpermuted noisy estimates 371 of the states of the machine. Optionally, errors can be corrected 380 to improve an accuracy of the recovered hidden states 390. For example, the third-party can use knowledge of temporal correlations of the underlying state sequence. For example, the third-party can apply a Viterbi reconstruction procedure to reduce errors in the state sequence reconstruction.

Figure 2:
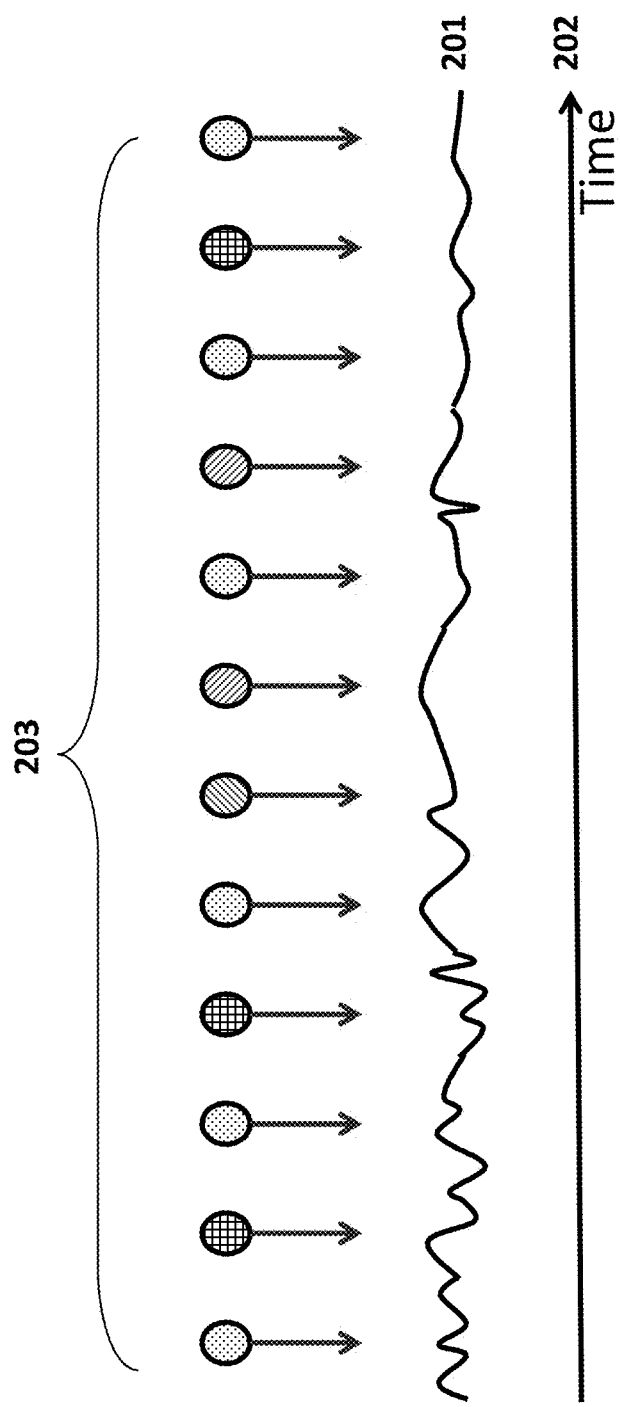
FIG. 2 is a schematic of a hidden Markov model process according to embodiments of the invention.

As shown in FIG. 2, the classification uses a hidden Markov model (HMM). The model is used to process noisy data 201 acquired over time 202 to estimate hidden states 203. Parameters of the HMM include distributions of state transition statistics and observation statistics.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for classifying data to determine hidden states of a machine, comprising:
   acquiring, by a client, data from the machine, wherein the data include samples;
   permuting randomly the data, according to a permutation, to generate permuted data;
   inserting, by the client, chaff in the permuted data at locations to generate private data;
   transmitting, by the client to the server, the private data;
   transmitting, by the client to the third-party the locations of the chaff and a permutation ordering;
   classifying, by the server, each sample of the private data independently according to a hidden Markov model (HMM) to obtain permuted noisy estimates of states of the machine and the chaff;
   transmitting, by the server to the third-party, the permuted noisy estimates of the states and the chaff;
   removing, by the third-party, the chaff using the locations;
   inverting, by the third-party after removing the chaff, the permuted noisy estimates using the permutation ordering to obtain unpermuted noisy estimates of the states of the machine.

2. The method of claim 1, further comprising:
   correcting errors, by the third-party, to obtain estimates of the hidden states.

3. The method of claim 1, wherein the server has either partial knowledge of a statistical distribution of the private data given each possible state, or a trained classifier that estimates the states, and the client has partial knowledge of a state transition distribution.

4. The method of claim 1, wherein parameters of the HMM include distributions of state transition statistics and statistics of the private data.

5. The method of claim 2, wherein the correcting uses temporal correlations to obtain the estimates of the hidden states.

6. The method of claim 1, wherein the client, the server and the third-party are connected by a communications network.

7. The method of claim 1, wherein information and computational resource capability between the three parties are asymmetric.

8. The method of claim 1, wherein the third-party applies a Viterbi reconstruction procedure during the classifying.

* * * * *